US012749898B2

(12) United States Patent

Khorassani

(10) Patent No.: US 12,749,898 B2

(45) Date of Patent: Sep. 29, 2026

(54) CONTROL METHOD FOR A GRID FOLLOWING VOLTAGE SOURCE CONVERTER WITHOUT PHASE LOCKED LOOP

(71) Applicant: TRANSGRID SOLUTIONS INC., Winnipeg (CA)

(72) Inventor: Mojtaba Mohaddes Khorassani, Winnipeg (CA)

(73) Assignee: Transgrid Solutions Inc., Winnipeg (CA)

( * ) Notice: Subject to any disclaimer, the term of this patent is extended or adjusted under 35 U.S.C. 154(b) by 241 days.

(21) Appl. No.: 18/597,218

(22) Filed: Mar. 6, 2024

(65) Prior Publication Data

US 2024/0305102 A1 Sep. 12, 2024

Related U.S. Application Data

(60) Provisional application No. 63/488,556, filed on Mar. 6, 2023.

(51) Int. Cl.

*H02J 3/38* (2026.01)
*H02J 3/36* (2026.01)
*H02J 3/40* (2026.01)

(52) U.S. Cl.

CPC . *H02J 3/38* (2013.01); *H02J 3/36* (2013.01); *H02J 3/40* (2013.01)

(58) Field of Classification Search

CPC ........ H02J 3/38; H02J 3/381; H02J 3/40–3/50
See application file for complete search history.

(56) References Cited

U.S. PATENT DOCUMENTS 10,027,253 B2 * 7/2018 Jasim .................... H02M 7/217
2021/0249862 A1 * 8/2021 Awal ......................... H02J 3/38

FOREIGN PATENT DOCUMENTS

CN 109950925 A * 6/2019

OTHER PUBLICATIONS

P. Verdelho, "Voltage type reversible rectifiers control methods in unbalanced and nonsinusoidal conditions," IECON '98. Proceedings of the 24th Annual Conference of the IEEE Industrial Electronics Society (Cat. No.98CH36200), Aachen, Germany, 1998, pp. 479-484 vol. 1, doi: 10.1109/IECON.1998.724290. (Year: 1998).*

(Continued)

*Primary Examiner* — Fred E Finch, III

(74) *Attorney, Agent, or Firm* — Ryan W. Dupuis; Kyle R. Satterthwaite; Ade & Company Inc.

(57) ABSTRACT

A control method for a grid following voltage source converter (VSC) that does not require a phased locked loop (PLL) allows the VSC to operate stably with an AC system with any strength. The voltage reference for converter valves of a controller of the VSC is produced by a proportional controller and the input to the proportional controller is the difference between the reference and the actual converter instantaneous current values. The instantaneous reference converter current waveform for each phase is generated by adding a scaled version of the voltage waveform of the same phase and a 90 degrees phase shifted waveform of the same. The instantaneous reference current waveform for each phase is multiplied by a gain K_I which is adjusted automatically based on the sum of the differences between the absolute values (or magnitudes) of the actual converter instantaneous phase currents and the reference converter instantaneous phase currents.

14 Claims, 5 Drawing Sheets

(56) References Cited

OTHER PUBLICATIONS

Machine translation of CN 109950925. Obtained from https://worldwide.espacenet.com on Nov. 20, 2025. (Year: 2019).*

S. Prakash and S. Mishra, "A Three-Sample-Based PLL-Less Hysteresis Current Control and Stability Analysis of a Single-Phase Active Distribution System," in IEEE Transactions on Industrial Electronics, vol. 68, No. 8, pp. 7045-7060, Aug. 2021, doi: 10.1109/TIE.2020.3000094. (Year: 2021).*

* cited by examiner

CONTROL METHOD FOR A GRID FOLLOWING VOLTAGE SOURCE CONVERTER WITHOUT PHASE LOCKED LOOP

This application claims the benefit under 35 U.S.C. 119(e) of U.S. provisional application Ser. No. 63/488,556, filed Mar. 6, 2023, the disclosure of which is incorporated herein by reference.

FIELD OF THE INVENTION

This invention is about a method to control a voltage source converter operating in Grid Following (GFL) mode without using a Phase Locked Loop (PLL).

BACKGROUND

Voltage Source Converters (VSC) are widely used in applications such as High Voltage Direct Current (HVDC) power transmission, Static Compensators (STATCOM), wind turbine generators, Photovoltaic (PV) solar farms and Battery Energy Storage Systems (BESS). A VSC connected to an AC system normally operates either in Grid Following (GFL) or Grid Forming (GFM) modes. The great majority of the voltage source converters today operate in GFL mode. A grid following VSC normally utilizes a phased locked loop to track the phase angle of the AC busbar voltage. The VSC active and reactive power is controlled by controlling the magnitude of its internal voltage and its phase angle with respect to the busbar voltage. Although different variations of GFL controllers exist, they all require a phase locked loop.

For stable operation of a VSC in GFL mode the AC system must have sufficient strength. This requirement is generally expressed in terms of the ratio of the system Short Circuit Level (SCL) to the VSC active power rating, or Short Circuit Ratio (SCR). If the short circuit ratio is too low the performance of VSC is not acceptable and it can be even unstable. The main cause of this issue is that the PLL cannot track the bus voltage angle adequately. This phenomenon is well known and has been researched extensively as described in J. Z. Zhou, H. Ding, S. Fan, Y. Zhang and A. M. Gole, "Impact of short-circuit ratio and phase-locked-loop parameters on the small-signal behavior of a vsc-hvdc converter", IEEE Transactions on Power Delivery, vol. 29, no. 5, pp. 2287-2296 October 2014.

SUMMARY OF THE INVENTION

This invention introduces a novel control method for a grid following VSC that does not require a phased locked loop (PLL). As such the VSC can operate stably with an AC system with any strength.

According to a first aspect of the present invention there is provided a controller for a voltage source converter (VSC), for example half bridge, full bridge MMC, 2 level, etc., where the voltage reference for the converter valves is produced by a proportional controller and the input to the proportional controller is the difference between the reference and the actual converter instantaneous current values.

According to a second aspect of the present invention there is provided a voltage source converter (VSC) controller where the instantaneous reference converter current waveform for each phase is generated by adding a scaled version of the voltage waveform of the same phase and a 90 degrees phase shifted waveform of the same.

According to a third aspect of the present invention, the voltage source converter controllers as described above may be further configured such that the instantaneous reference current waveform for each phase is multiplied by a gain K_I, and this gain is adjusted automatically based on the sum of the differences between the absolute values (or magnitudes) of the actual converter instantaneous phase currents and the reference converter instantaneous phase currents.

According to a fourth aspect of the present invention, a voltage source converter controller similar to the preceding voltage source converter controller may be further configured such that the gain K_I for each phase is separately adjusted automatically based on the difference between the absolute value (or magnitude) of the actual and reference converter instantaneous phase currents of that phase.

According to a fifth aspect of the present invention, the voltage source converter controller described in the first aspect of the present invention may be further configured such that the instantaneous reference current waveforms for the three phases may contain both positive and negative sequence components and may be generated as described in equation (1) below, as represented in an alternative embodiment of the invention in the accompanying figures.

According to a further aspect of the invention there is provided a method of controlling a voltage sourced converter (VSC) electrically connected to an alternating current (AC) electrical power system to operate in a grid-following mode with respect to the AC electrical power system without a phase locked loop operatively connected between the VSC and the AC electrical power system, wherein the VSC and the AC electrical power system are electrically interconnected by an AC bus bar, wherein the AC electrical power system has three phases, the method comprising:

- forming, for each phase of the AC electrical power system, direct-axis and quadrature-axis voltage signals based on a corresponding phase voltage measured at the AC bus bar, wherein the direct-axis reference voltage signal comprises a sinusoidal wave with a magnitude of one and in phase with a positive sequence component of the corresponding phase voltage at the AC bus bar and the quadrature-axis reference voltage signal comprises a sinusoidal wave with a magnitude of one and 90 degrees out of phase with the positive sequence component of said corresponding phase voltage;
- using the direct-axis and quadrature-axis voltage signals associated with each phase of the AC electrical power system, determining, for each phase of the AC electrical power system, a reference voltage signal for output to a firing pulse modulator of the VSC to form an output voltage of the VSC associated with the phase, wherein determining the reference voltage signal for the phase comprises:
  - forming an instantaneous reference current signal for the phase based on multiplicative products of (i) the direct-axis voltage signal and a direct-axis reference current magnitude, and (ii) the quadrature-axis voltage signal and a quadrature-axis reference current magnitude;
  - forming a phase current error signal for the phase based on the instantaneous reference current signal, with a gain factor applied thereto, and an actual instantaneous phase current signal for the phase; and
  - forming the reference voltage signal based on the phase current error signal and a proportional gain factor; and for each phase, outputting the reference voltage signal to the firing pulse modulator of the VSC.

Typically, there is also provided a step of measuring the phase voltages at the AC bus bar.

Typically, the phase shift forming the quadrature-axis voltage signal is in a leading direction.

It will be appreciated that the direct-axis and quadrature-axis reference current magnitudes are scalar values.

In the illustrated arrangement, the direct-axis and quadrature-axis reference voltage signals are in the form of sinusoidal or sine waves.

BRIEF DESCRIPTION OF THE DRAWINGS

Some embodiments of the invention will now be described in conjunction with the accompanying drawings in which.

In the drawings like characters of reference indicate corresponding parts in the different figures.

DETAILED DESCRIPTION

Figure 1:
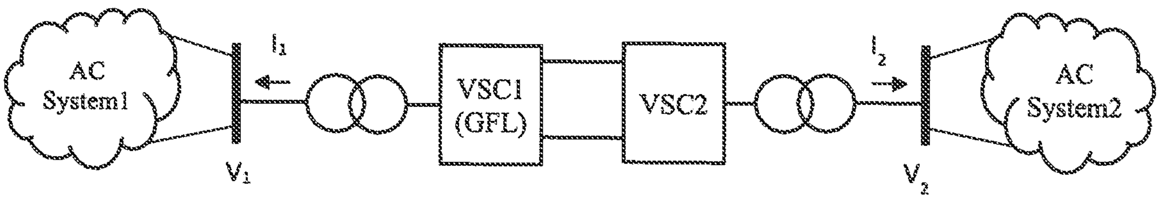
FIG. 1 is a schematic representation of a voltage sourced converter (VSC) electrically connected to an alternating current (AC) electrical power system to operate in a grid-following mode with respect to the AC electrical power system according to the present invention.

Referring to the accompanying figures there is illustrated a controller for a voltage sourced converter (VSC), in which the VSC is electrically connected to an alternating current (AC) electrical power system to operate in a grid-following mode with respect to the AC electrical power system without a phase locked loop operatively connected between the VSC and the AC electrical power system. In this instance, the VSC and the AC electrical power system are electrically interconnected by an AC bus bar.

In this instance, the AC electrical power system has three phases. For each phase of the AC electrical power system, direct-axis and quadrature-axis voltage signals are formed based on a corresponding phase voltage measured at the AC bus bar. The direct-axis reference voltage signal comprises a sinusoidal wave with a magnitude of one and in phase with a positive sequence component of the corresponding phase voltage at the AC bus bar. The quadrature-axis reference voltage signal comprises a sinusoidal wave with a magnitude of one and 90 degrees out of phase with the positive sequence component of said corresponding phase voltage.

The direct-axis and quadrature-axis voltage signals associated with each phase of the AC electrical power system are used in determining, for each phase of the AC electrical power system, a reference voltage signal for output to a firing pulse modulator of the VSC to form an output voltage of the VSC associated with the phase. Determination of the reference voltage signal for the phase includes forming an instantaneous reference current signal for the phase based on multiplicative products of (i) the direct-axis voltage signal and a direct-axis reference current magnitude, and (ii) the quadrature-axis voltage signal and a quadrature-axis reference current magnitude. This is followed by forming a phase current error signal for the phase based on the instantaneous reference current signal, with a gain factor applied thereto, and an actual instantaneous phase current signal for the phase. Subsequently, the reference voltage signal is formed based on the phase current error signal and a proportional gain factor.

Finally, for each phase, the reference voltage signal is outputted to the firing pulse modulator of the VSC.

Typically, there is also provided a step of measuring the phase voltages at the AC bus bar.

Typically, the phase shift forming the quadrature-axis voltage signal is in a leading direction.

It will be appreciated that the direct-axis and quadrature-axis reference current magnitudes are scalar values.

In the illustrated arrangement, the direct-axis and quadrature-axis reference voltage signals are in the form of sinusoidal or sine waves.

The gain factor applied to instantaneous reference current signal is preferably an adaptive gain factor determined by a proportional integral controller receiving, as input, a difference between modified versions of the instantaneous reference current signal and the actual instantaneous phase current signal. In this instance, the modified versions of the instantaneous reference current signal and the actual instantaneous phase current signal are formed by applying a common mathematical operator respectively thereto such that the modified version of each of the instantaneous reference current signal and the actual instantaneous phase current signal has a non-zero average value. The common mathematical operator is one of absolute value, magnitude or square. The adaptive gain factor is the same for all of the three phases and is determined by a proportional integral controller receiving, as input, a sum of differences between the modified versions of the instantaneous reference current signal and the actual instantaneous phase current signal for each of the phases.

When the direct-axis and quadrature-axis reference current magnitudes respectively comprise a first component based on a positive sequence current signal and a second component based on a negative sequence current signal, the instantaneous reference current signal of a first one of the phases is based on a sum of multiplicative products of (i) the direct-axis voltage signal of the first phase and the first and second components of the direct-axis reference current magnitude, and (ii) the quadrature-axis voltage signal of the first phase and the first and second components of the quadrature-axis reference current magnitude.

The instantaneous reference current signal of a second one of the phases is based on a sum of multiplicative products of (i) the direct-axis voltage signal of the second phase and the first component of the direct-axis reference current magnitude, (ii) the quadrature-axis voltage signal of the second phase and the first component of the quadrature-axis reference current magnitude, (iii) the direct-axis voltage signal of a third one of the phases and the second component of the direct-axis reference current magnitude, and (iv) the quadrature-axis voltage signal of the third phase and the second component of the quadrature-axis reference current magnitude.

The instantaneous reference current signal of the third phase is based on a sum of multiplicative products of (i) the direct-axis voltage signal of the third phase and the first component of the direct-axis reference current magnitude, (ii) the quadrature-axis voltage signal of the third phase and the first component of the quadrature-axis reference current magnitude, (iii) the direct-axis voltage signal of the second phase and the second component of the direct-axis reference current magnitude, and (iv) the quadrature-axis voltage signal of the second phase and the second component of the quadrature-axis reference current magnitude.

The proportional integral controller that determines the adaptive gain factor includes a filter in trailing relation to an integrator of a proportional integral controller.

Referring now to the accompanying figures, the converter VSC1 connected to an AC system as shown in FIG. 1 is first considered. The VSC can be an HVDC terminal as shown in this figure or a STATCOM or any other VSC. The converter may utilize the Modular Multi-level Converter (MMC) technology or any other technology such as 2-level or 3-level technology. If the MMC technology is utilized, the submodules can be of Half Bridge (HB), Full Bridge (FB), or any other arrangement. For the sake of simplicity this document focuses on the controller for VSC1 only. VSC2 can use the same control concept or any other controller.

Figure 2:
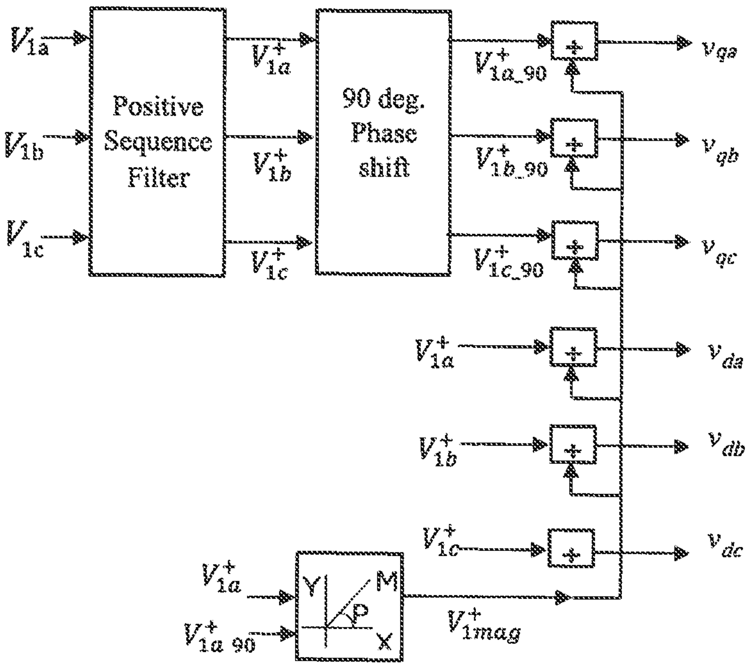
FIG. 2 is a schematic representation of a first portion of the controller according to the present invention.
Figure 3:
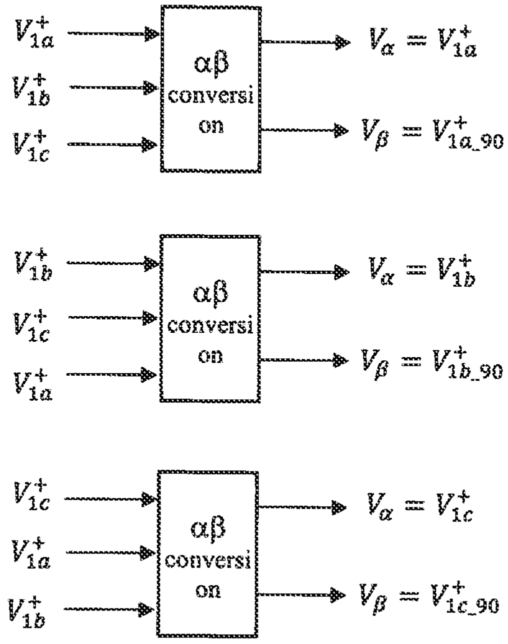
FIG. 3 is a schematic representation of a conversion block providing a 90-degree phase shift using alpha-beta conversion according to the present invention.

The first part of the proposed controller is presented in FIG. 2. The objective of this part is to produce six sine waves $v_{dx}$ and $v_{qx}$ where x is either a, b or c. The first three signals ($v_{dx}$) are three sine waves each with a magnitude of 1 and in phase with one phase of the positive sequence component of the bus voltage $V_1$. The other three signals ($v_{qx}$) are 90 degrees phase shifted with respect to the first set. As shown, the signals can be generated using a positive sequence filter and a 90 degrees phase shifter. The 90 degrees phase shift can be obtained in different ways; a simple method that avoids any dynamics is the use of αβ conversion as shown in FIG. 3. When the phase voltages $V_{a,b,c}$ are entered into the conversion block, the resultant $V_\alpha$ is in phase and $V_\beta$ is at 90 degrees with respect to $V_a$ i.e. the first entry to the conversion block. Similarly, if the inputs to the conversion block are ordered as $V_{b,c,a}$ then $V_\alpha$ will be in phase with $V_b$ and $V_\beta$ at 90 degrees with respect to $V_b$. The αβ conversion can therefore be used three times to produce sign waves at 90 degrees with respect to the three phase voltages. Note that αβ conversion is an algebraic conversion with no dynamics.

Figure 5:
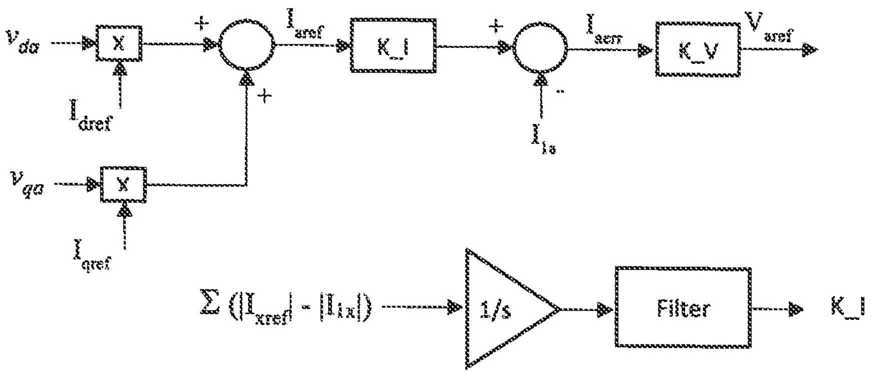
FIG. 5 is a schematic representation of a second stage of the controller according to the present invention.

The next part of the controller is shown in FIG. 5. For simplicity, this figure only shows the controller for phase a, the controllers for the other two phases are similar. In this stage, first the reference sine wave currents $I_{aref}$, $I_{bref}$, $I_{cref}$ for each of the three phases are produced. This is achieved by multiplying the reference scalar values $I_{dref}$ and $I_{qref}$ by the corresponding voltage waveforms $v_{dx}$ and $v_{qx}$ where subscript x refers to phase a, b or c. The idea here is that the reference current for phase x is a sine wave consisting of two components: one component in phase with $$V_{1x}^{+}$$

and with a magnitude of $I_{dref}$, and one component at 90 degrees with respect to $$V_{1x}^{+}$$

and with a magnitude of $I_{qref}$.

Figure 4:
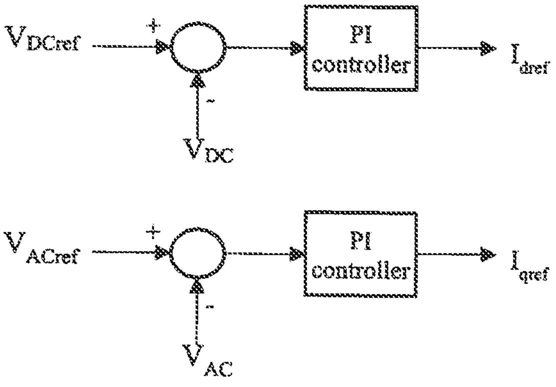
FIG. 4 is a conceptual depiction of the calculation of the d and q axis current magnitude reference according to the present invention.

$I_{dref}$ and $I_{qref}$ are the magnitudes of the desired d-axis and q-axis currents produced in the other sections of the controller in the conventional way. For example, in a converter operating in DC voltage control mode, $I_{dref}$ can be produced by comparing the reference and actual DC voltages and using a PI controller. Similarly, if the converter is operating in active power control mode, $I_{dref}$ can be produced by comparing the reference and actual active power values. As for the $I_{qref}$, in a converter operating in AC voltage control mode, $I_{qref}$ can be produced by comparing reference and actual AC voltage magnitudes and using a PI controller. FIG. 4 conceptually shows the examples of how $I_{dref}$ and $I_{qref}$ may be produced, although these higher order controllers are not the subject of this invention.

Once the reference instantaneous current waveform $I_{xref}$ is produced it is compared with the actual instantaneous phase current lix. The reference voltage $V_{xref}$ is produced from the phase current error using a proportional controller with the gain K_V. Once the reference phase voltage is produced it is passed to the low-level controller where it is used in a modulator to produce the firing pulses for the converter submodules. The low-level controller is the same as standard controllers commonly used in voltage source converters and therefore is not discussed here.

As mentioned above, the phase voltage reference is produced by a proportional controller. This means the phase current always has a steady state error. The magnitude of this error depends on the proportional gain K_V, which cannot be increased too much due to the stability concerns. Note that it is not possible here to use a PI controller for removing the steady state error, because $I_{xerr}$ is a sine wave. A novel adaptive controller is presented here for removing the steady state error. In this method an adaptive gain K_I is applied to the current reference. The gain is adjusted such that the actual phase current becomes equal to the reference current, hence the steady state error is eliminated. The controller first calculates the total difference between the absolute values of all reference currents and the actual phase currents. This total difference is fed into an integrator that produces the gain K_I. The output of the integrator may contain some ripples that are removed using a filter. During the operation, if the actual current is less than the reference current the integrator will increase K_I. This is effectively equivalent to increasing the magnitude of the instantaneous current reference. As a result, the magnitude of the actual phase current is increased until it is equal to the reference current, which will cause the integrator input to drop to zero and K_I to remain constant. Similarly, if the actual current is larger than the reference current the integrator will reduce K_I until the actual current is equal to the reference current. Using this method, in steady state $I_{xref}=I_{1x}$, although $I_{xerr}$ (where x is a, b or c) is not equal to zero.

Figure 6:
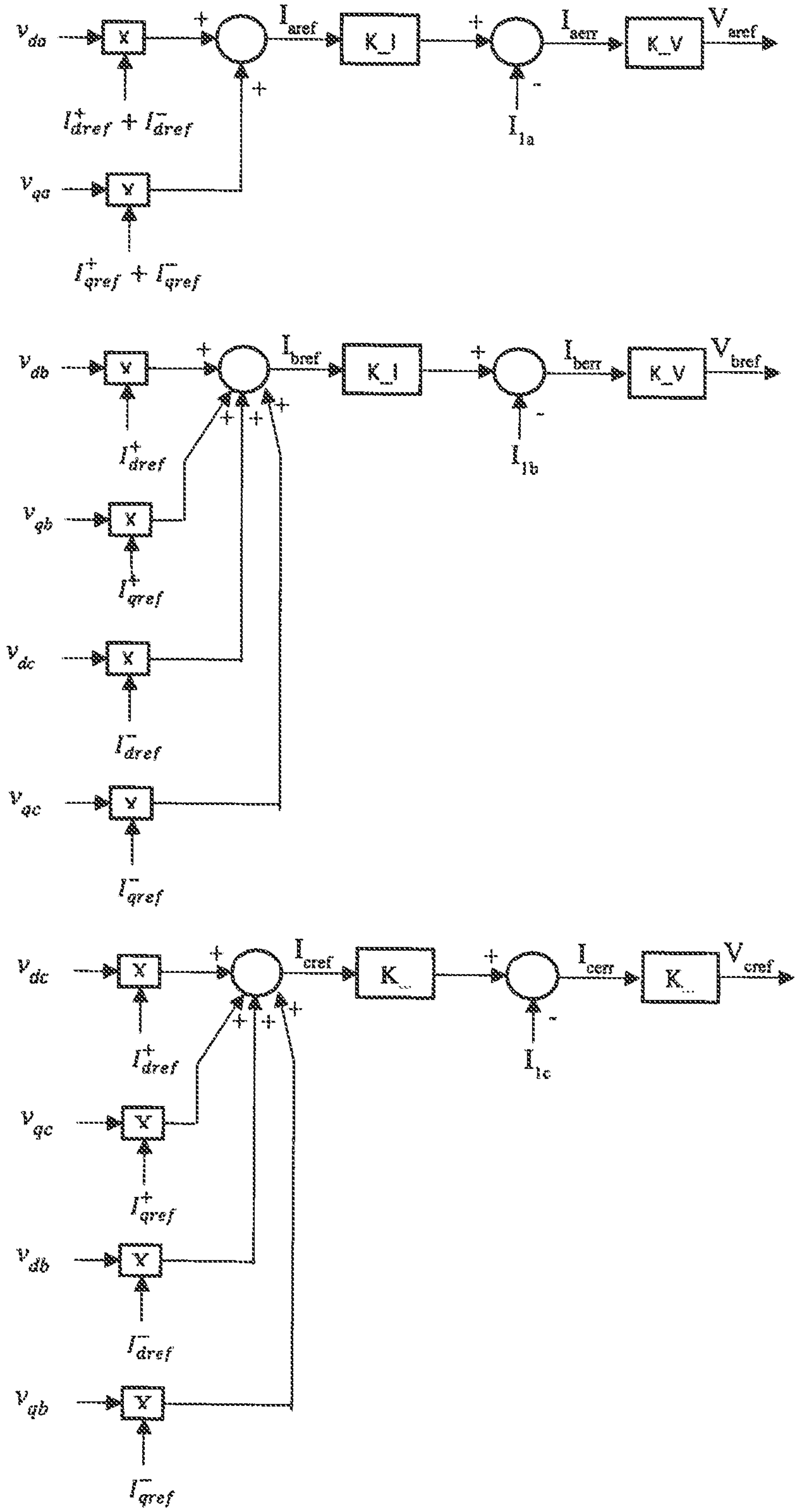
FIG. 6 is a schematic representation of a further embodiment of the controller where the VSC is required to supply both positive and negative sequence currents to the AC system.

Turning now to FIG. 6, according to another embodiment of the invention, the reference instantaneous current waveform for each phase is a combination of the positive and negative sequence currents as detailed in equation (1) below:

$$I_{aref} = \left(I_{dref}^{+} + I_{dref}^{-}\right) \cdot v_{da} + \left(I_{qref}^{+} + I_{qref}^{-}\right) \cdot v_{qa} \quad (1)$$

-continued $$I_{bref} = I^{+}_{dref}\cdot v_{db} + I^{+}_{qref}\cdot v_{qb} + I^{-}_{dref}\cdot v_{dc} + I^{-}_{qref}\cdot v_{qc}$$

$$I_{cref} = I^{+}_{dref}\cdot v_{dc} + I^{+}_{qref}\cdot v_{qc} + I^{-}_{dref}\cdot v_{db} + I^{-}_{qref}\cdot v_{qb}$$

Note that $$I^{+}_{dref},\ I^{+}_{qref},\ I^{-}_{dref} \text{ and } I^{-}_{qref}$$

are scalers, but $v_{da}$, $v_{qa}$, $v_{db}$, $v_{qb}$, $v_{dc}$, $v_{qc}$ and $I_{aref}$, $I_{bref}$, $I_{cref}$ are nearly sine waves. As suggested by equation (1), in this case the reference current for each phase consists of two parts: the positive sequence part and the negative sequence part. The positive sequence part consists of the d and q components where the d component is in phase with the positive sequence voltage of the same phase and the q component is at 90 degrees with it. For example, the reference current for phase a, $I_{aref}$, consists of a positive sequence component equal to $$I^{+}_{dref}\cdot v_{da} + I^{+}_{qref}\cdot v_{qa}.$$

Similarly, the negative sequence part consists of d and q components, however for the phase b, the d component is in phase with $v_{dc}$ (positive sequence voltage of phase c) while for phase c, the d component is in phase with $v_{db}$.

Figure 7:
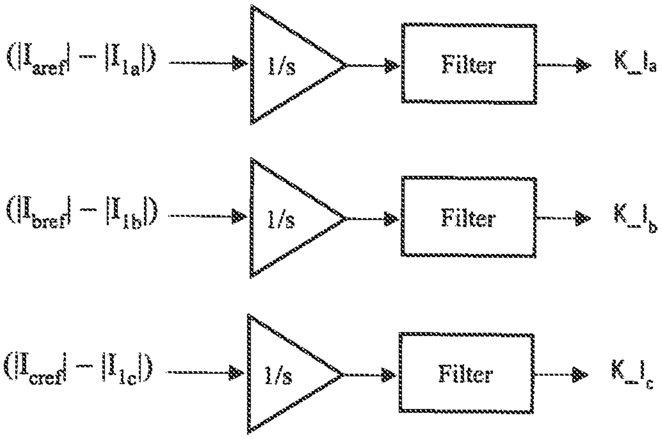
FIG. 7 schematically represents the calculation of separate current gains K_I for each phase according to the present invention.

Turning now to FIG. 7, in yet another embodiment of the invention, the gain K_I for each phase is calculated only from the difference between the actual and reference currents of the same phase. As shown, in this embodiment the difference between the absolute values (or squares) of the reference current and the actual current for each phase is fed to an integrator. The output of the integrator is filtered to remove ripples and used as the current gain for that phase. In this embodiment the current gains for the three phases can be different.

Since various modifications can be made in the invention as herein above described, and many apparently widely different embodiments of same made, it is intended that all matter contained in the accompanying specification shall be interpreted as illustrative only and not in a limiting sense.

The invention claimed is:

1. A method of controlling a voltage sourced converter (VSC) electrically connected to an alternating current (AC) electrical power system to operate in a grid-following mode with respect to the AC electrical power system without a phase locked loop operatively connected between the VSC and the AC electrical power system, wherein the VSC and the AC electrical power system are electrically interconnected by an AC bus bar, wherein the AC electrical power system has three phases, the method comprising:

forming, for each phase of the AC electrical power system, direct-axis and quadrature-axis voltage signals based on a corresponding phase voltage measured at the AC bus bar, wherein the direct-axis reference voltage signal comprises a sinusoidal wave with a magnitude of one and in phase with a positive sequence component of the corresponding phase voltage at the AC bus bar and the quadrature-axis reference voltage signal comprises a sinusoidal wave with a magnitude of one and 90 degrees out of phase with the positive sequence component of said corresponding phase voltage;

using the direct-axis and quadrature-axis voltage signals associated with each phase of the AC electrical power system, determining, for each phase of the AC electrical power system, a reference voltage signal for output to a firing pulse modulator of the VSC to form an output voltage of the VSC associated with the phase, wherein determining the reference voltage signal for the phase comprises:

forming an instantaneous reference current signal for the phase based on multiplicative products of (i) the direct-axis voltage signal and a direct-axis reference current magnitude, and (ii) the quadrature-axis voltage signal and a quadrature-axis reference current magnitude;

forming a phase current error signal for the phase based on the instantaneous reference current signal, with a gain factor applied thereto, and an actual instantaneous phase current signal for the phase; and forming the reference voltage signal based on the phase current error signal and a proportional gain factor; and for each phase, outputting the reference voltage signal to the firing pulse modulator of the VSC;

wherein the gain factor applied to the instantaneous reference current signal is an adaptive gain factor determined by a proportional integral controller receiving, as input, a difference between modified versions of the instantaneous reference current signal and the actual instantaneous phase current signal; and wherein the modified versions of the instantaneous reference current signal and the actual instantaneous phase current signal are formed by applying a common mathematical operator respectively thereto such that the modified version of each of the instantaneous reference current signal and the actual instantaneous phase current signal has a non-zero average value.

2. The method of claim 1 wherein the common mathematical operator is one of absolute value, magnitude or square.

3. The method of claim 1 wherein the adaptive gain factor is the same for all of the three phases and is determined by a proportional integral controller receiving, as input, a sum of differences between the modified versions of the instantaneous reference current signal and the actual instantaneous phase current signal for each of the phases.

4. The method of claim 1 wherein, when the direct-axis and quadrature-axis reference current magnitudes respectively comprise a first component based on a positive sequence current signal and a second component based on a negative sequence current signal:

(a) the instantaneous reference current signal of a first one of the phases is based on a sum of multiplicative products of (i) the direct-axis voltage signal of the first phase and the first and second components of the direct-axis reference current magnitude, and (ii) the quadrature-axis voltage signal of the first phase and the first and second components of the quadrature-axis reference current magnitude;

(b) the instantaneous reference current signal of a second one of the phases is based on a sum of multiplicative products of (i) the direct-axis voltage signal of the second phase and the first component of the direct-axis reference current magnitude, (ii) the quadrature-axis voltage signal of the second phase and the first component of the quadrature-axis reference current magnitude, (iii) the direct-axis voltage signal of a third one of the phases and the second component of the direct-axis reference current magnitude, and (iv) the quadrature-axis voltage signal of the third phase and the second component of the quadrature-axis reference current magnitude; and (c) the instantaneous reference current signal of the third phase is based on a sum of multiplicative products of (i) the direct-axis voltage signal of the third phase and the first component of the direct-axis reference current magnitude, (ii) the quadrature-axis voltage signal of the third phase and the first component of the quadrature-axis reference current magnitude, (iii) the direct-axis voltage signal of the second phase and the second component of the direct-axis reference current magnitude, and (iv) the quadrature-axis voltage signal of the second phase and the second component of the quadrature-axis reference current magnitude.

5. The method of claim 1 wherein the proportional integral controller that determines the adaptive gain factor including a filter in trailing relation to an integrator of proportional integral controller.

6. The method of claim 1 further comprising measuring the phase voltages at the AC bus bar.

7. The method of claim 1 wherein the phase shift forming the quadrature-axis voltage signal is in a leading direction.

8. The method of claim 1 wherein the direct-axis and the quadrature-axis reference current magnitudes are scalar values.

9. The method of claim 1 wherein the direct-axis and quadrature-axis reference voltage signals are in the form of sinusoidal or sine waves.

10. A method of controlling a voltage sourced converter (VSC) electrically connected to an alternating current (AC) electrical power system to operate in a grid-following mode with respect to the AC electrical power system without a phase locked loop operatively connected between the VSC and the AC electrical power system, wherein the VSC and the AC electrical power system are electrically interconnected by an AC bus bar, wherein the AC electrical power system has three phases, the method comprising:

forming, for each phase of the AC electrical power system, direct-axis and quadrature-axis voltage signals based on a corresponding phase voltage measured at the AC bus bar, wherein the direct-axis reference voltage signal comprises a sinusoidal wave with a magnitude of one and in phase with a positive sequence component of the corresponding phase voltage at the AC bus bar and the quadrature-axis reference voltage signal comprises a sinusoidal wave with a magnitude of one and 90 degrees out of phase with the positive sequence component of said corresponding phase voltage;

using the direct-axis and quadrature-axis voltage signals associated with each phase of the AC electrical power system, determining, for each phase of the AC electrical power system, a reference voltage signal for output to a firing pulse modulator of the VSC to form an output voltage of the VSC associated with the phase, wherein determining the reference voltage signal for the phase comprises:

forming an instantaneous reference current signal for the phase based on multiplicative products of (i) the direct-axis voltage signal and a direct-axis reference current magnitude, and (ii) the quadrature-axis voltage signal and a quadrature-axis reference current magnitude;

forming a phase current error signal for the phase based on the instantaneous reference current signal, with a gain factor applied thereto, and an actual instantaneous phase current signal for the phase; and forming the reference voltage signal based on the phase current error signal and a proportional gain factor; and for each phase, outputting the reference voltage signal to the firing pulse modulator of the VSC;

wherein, when the direct-axis and quadrature-axis reference current magnitudes respectively comprise a first component based on a positive sequence current signal and a second component based on a negative sequence current signal:

(a) the instantaneous reference current signal of a first one of the phases is based on a sum of multiplicative products of (i) the direct-axis voltage signal of the first phase and the first and second components of the direct-axis reference current magnitude, and (ii) the quadrature-axis voltage signal of the first phase and the first and second components of the quadrature-axis reference current magnitude;

(b) the instantaneous reference current signal of a second one of the phases is based on a sum of multiplicative products of (i) the direct-axis voltage signal of the second phase and the first component of the direct-axis reference current magnitude, (ii) the quadrature-axis voltage signal of the second phase and the first component of the quadrature-axis reference current magnitude, (iii) the direct-axis voltage signal of a third one of the phases and the second component of the direct-axis reference current magnitude, and (iv) the quadrature-axis voltage signal of the third phase and the second component of the quadrature-axis reference current magnitude; and (c) the instantaneous reference current signal of the third phase is based on a sum of multiplicative products of (i) the direct-axis voltage signal of the third phase and the first component of the direct-axis reference current magnitude, (ii) the quadrature-axis voltage signal of the third phase and the first component of the quadrature-axis reference current magnitude, (iii) the direct-axis voltage signal of the second phase and the second component of the direct-axis reference current magnitude, and (iv) the quadrature-axis voltage signal of the second phase and the second component of the quadrature-axis reference current magnitude.

11. The method of claim 10 further comprising measuring the phase voltages at the AC bus bar.

12. The method of claim 10 wherein the phase shift forming the quadrature-axis voltage signal is in a leading direction.

13. The method of claim 10 wherein the direct-axis and the quadrature-axis reference current magnitudes are scalar values.

14. The method of claim 10 wherein the direct-axis and quadrature-axis reference voltage signals are in the form of sinusoidal or sine waves.

* * * * *